United States Patent
Flickner et al.

(12)

(10) Patent No.: US 6,282,553 B1
(45) Date of Patent: Aug. 28, 2001

(54) GAZE-BASED SECURE KEYPAD ENTRY SYSTEM

(75) Inventors: Myron Dale Flickner; Qi Lu; Carlos Hitoshi Morimoto, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/185,546

(22) Filed: Nov. 4, 1998

(51) Int. Cl.[7] .......................................... G06F 3/00

(52) U.S. Cl. ............................. 708/141; 345/156

(58) Field of Search ..................... 708/131–132, 708/141–143; 345/156

(56) References Cited

U.S. PATENT DOCUMENTS

| 5,689,619 | * | 11/1997 | Smyth | ................................... 345/156 |
| 5,864,544 | * | 12/1998 | Kahn et al. | .......................... 345/156 |

* cited by examiner

*Primary Examiner*—Tan V. Mai
(74) *Attorney, Agent, or Firm*—Khanh Q. Tran, Esq.; McGinn & Gibb, PLLC

(57) ABSTRACT

A system for secure data entry, includes a virtual keypad having a plurality of keys, a mechanism for determining to which virtual key of the keypad a user is looking, and an actuator, operable by the user, for confirming key selection. Another system for secure data entry, includes a virtual keypad having a plurality of keys, an eye tracker for tracking eye movement of a user, and for receiving a coded input from an eye movement of the user gazing upon at least a selected one of the keys of the virtual keypad, and an actuator for being selectively actuated by the user upon confirmation of the coded input by the user.

23 Claims, 3 Drawing Sheets

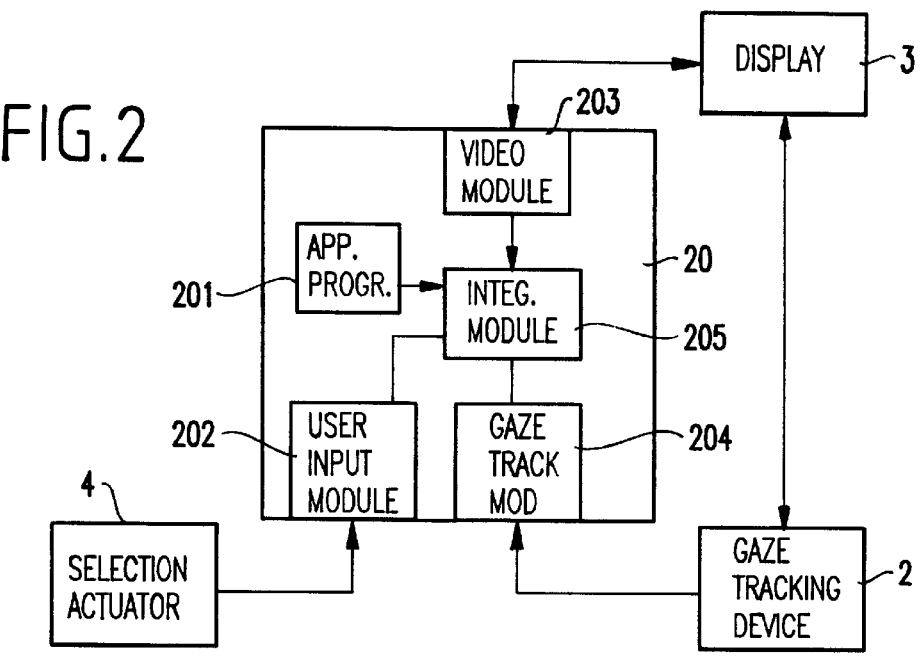
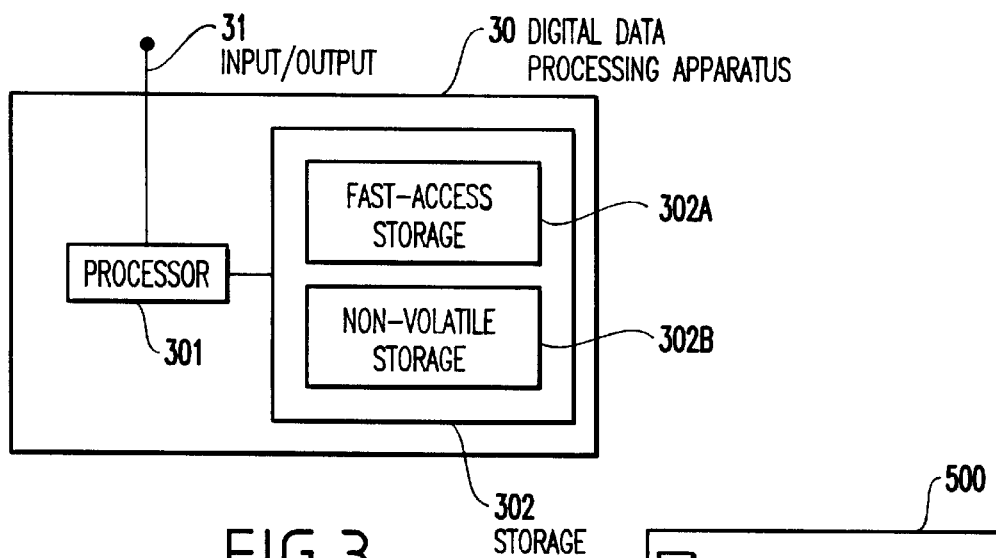
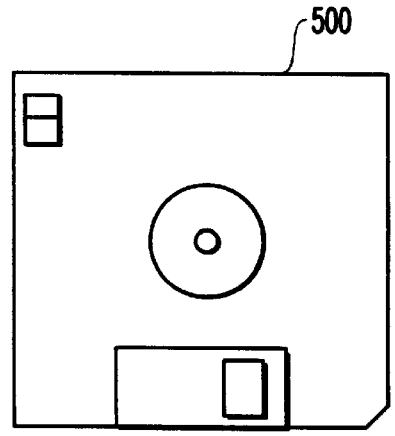

GAZE-BASED SECURE KEYPAD ENTRY SYSTEM

BACKGROUND OF THE INVENTION

1. Field of the Invention

The present invention generally relates to a security device for a secure area such as a limited access building or for a public service-providing mechanism such as for a public telephone, an automated teller machine (ATM), fuel service stations, voting booths, kiosks, course registration areas, and the like. More particularly, the present invention relates to a structure in which data (e.g., telephone numbers, personal identification numbers (PIN) or the like) are enterable by a user such that it is extremely difficult, if not impossible, for an unwanted observer to obtain the data.

2. Description of the Related Art

Public touch-tone telephones (e.g., non-rotary telephones) are often spied for telephone credit card numbers by thieves remotely watching with a video camera, binoculars or the like. By watching the sequence of numbers pressed on the keypad buttons, a thief can determine (and subsequently use or pass on) the telephone credit card number or other data. Similar problems exist at ATMs.

Currently, telephone credit cards and ATM cards with magnetic strips or the like are provided in an attempt to avoid such a problem. However, such a procedure works only if the telephone and the card (or the bank's system and the card) are compatible. As a practical matter, such compatibility is sometimes a problem, and, at the very least, difficulties arise if the magnetic strip becomes damaged or worn, or if the card is unavailable to the user at the time the user requires it.

SUMMARY OF THE INVENTION

In view of the foregoing and other problems of the conventional systems and methods, it is an object of the present invention to provide a security system for a public service-providing mechanism such as for an automated teller machine (ATM), a fuel service station, a voting booth, a kiosk, course registration area, and the like.

Another object is to provide a system which makes it extremely difficult, if not impossible, for an unwanted observer to obtain the data enterable by the user.

In a first aspect of the present invention, a system for secure data entry, includes a virtual keypad having a plurality of keys, a mechanism for determining to which virtual key of said virtual keypad a user is looking, and an actuator, operable by the user, for confirming key selection.

In a second aspect, a security system for a service-providing mechanism, includes a virtual keypad including a plurality of keys, an eye tracker for tracking eye movement of a user, and for receiving a coded input from an eye movement of the user gazing upon at least a selected one of the keys of the keypad, and an actuator for being selectively actuated by the user upon confirmation of the coded input.

In a third aspect of the present invention, a computer-implemented method for eye gaze-assisted number generating includes operating a gaze tracking apparatus to monitor eye orientation of a computer operator as the operator views a virtual keypad having a plurality of keys thereon, according to the operator's eye orientation, determining a key of the virtual keypad being gazed at by the operator, and highlighting said key on the virtual keypad for confirmation by the operator.

In a fourth aspect of the present invention, A signal-bearing medium tangibly embodying a program of machine-readable instructions executable by a digital processing apparatus to perform a method for computer-implemented eye gaze assisted number generating, the said method including operating a gaze tracking apparatus to monitor eye orientation of a computer operator as the operator views a virtual keypad a plurality of keys thereon, according to the operator's eye orientation, determining a key of the display being gazed at by the operator, and highlighting the key on the virtual keypad.

In a fifth aspect of the present invention, a computer-driven eye gaze assisted number displaying system, includes a gaze-tracking apparatus for monitoring eye orientation of an operator as the operator views a virtual keypad having a plurality of keys, and a computer, responsive to the monitored eye orientation, for computing a selected key of the plurality of keys according to the monitored eye orientation, and for providing an output to highlight the selected key on the virtual keypad.

With the unique and unobvious aspects and features of the present invention, telephone numbers or any data can be entered from a user in a public place in a manner that makes spying virtually impossible.

BRIEF DESCRIPTION OF THE DRAWINGS

The foregoing and other objects, aspects and advantages will be better understood from the following detailed description of a preferred embodiment of the invention with reference to the drawings, in which:

FIG. 2 illustrates a block diagram of the security system 1 according to the present invention;

FIG. 3 illustrates a digital data processing apparatus incorporating the present invention;

FIG. 5 illustrates a storage medium for storing a program for the method of operation of the present invention.

DETAILED DESCRIPTION OF A PREFERRED EMBODIMENT OF THE INVENTION

Figure 1A:
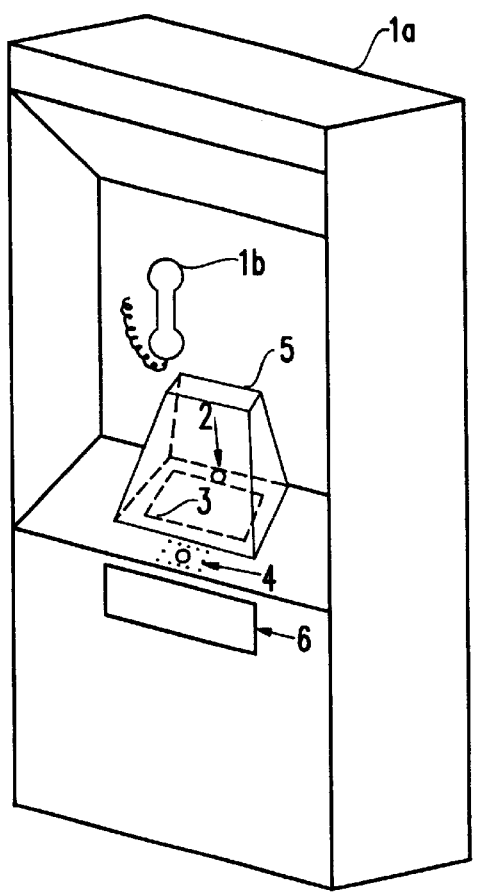
FIG. 1A illustrates schematically an exemplary environment and configuration of a security system 1 according to the present invention.

Referring now to the drawings, and more particularly to FIGS. 1A–2, there is shown a preferred embodiment of the present invention.

Turning first to FIG. 1A, there is shown a security device which generally includes establishing a manner of communication between user and device that makes it difficult (if not impossible) for an outsider (e.g., thief, unwanted observer, etc.) to interpret the communication and thereby obtain the user-entered data (e.g., telephone credit card or PIN numbers).

To achieve the objects of the invention as described above and overcome the problems of the conventional structures and methods, generally the invention monitors the user's eye gaze direction along with a single selection button.

As shown in the schematic of FIG. 1A, a practical example of the present invention is shown. Specifically, a security system 1 is provided for use, for example, with a public telephone system including a housing 1a and a hand-set 1b for communicating with the called party. A similar system could be installed at another public service-providing mechanism such as an ATM, a fuel service station, a voting booth, kiosk, course registration area, and the like.

A gaze tracking apparatus 2 (e.g., camera system 2 and illuminators) is provided for tracking a user's gaze, thereby to provide the requisite security features discussed in further detail below. The user's gaze is found and detected by means and methods such as known and described, for example, in "Methods & Designs: Survey of Eye Movement Recording Methods", *Behavior Research Methods & Instrumentation*, 1975, Vol. 7 (5), 397–429).

The direction of the user's gaze is determined by known gaze-tracking apparatus such as described in several U.S. patents.

As a specific example of one gaze tracking approach for use in the present invention, reference is made to the following patents, incorporated herein in their entirety:

(1) U.S. Pat. No. 4,536,670 to Hutchinson, issued Jun. 6, 1989 and entitled "Eye Movement Detector", (2) U.S. Pat. No. 4,950,069 to Hutchinson, issued Aug. 21, 1990 and entitled "Eye Movement Detector With Improved Calibration and Speed", and (3) U.S. Pat. No. 4,595,990 to Garwin et al., issued Jun. 17, 1986 and entitled "Eye Controlled Information Transfer". Also, although the invention's gaze tracking apparatus 2 may be a custom product, a commercially available product may be used instead, such as the EyeTrac Series 4000 product by Applied Science Labs, or the EyeGaze system by LC Technology.

Advantageously, the invention is capable of accurate operation with inexpensive, relatively low-resolution gaze tracking apparatuses. For instance, significant benefits can be gained with gaze tracking accuracy ±3 degrees, which is a low error requirement for gaze tracking systems. With this level of permissible error, the gaze tracking apparatus 21 may comprise an inexpensive video camera, such as video camera 2 shown in FIG. 1A, many of which are known and becoming increasingly popular for use in computer systems.

Thus, the gaze tracking apparatus monitors eye orientation of a user (operator) as the operator views a display 3 having a virtual keypad with number keys or the like, and a sensing device interfaced with a processor/computer to monitor an operator input device 4 (selection actuator device 4) for activation by the operator. The manual operator input device 4 may include a mechanically-activated device, such as a two-position switch, button, and the like. According to the operator's eye orientation, the computer measures the point of the operator's gaze, called a "gaze position."

When the computer detects mechanical activation of the operator input device (e.g., selection actuator 4) while gazing at a selected numeral, it stores such a numeral for retrieval subsequently and confirmation. Alternatively, such a numeral may be immediately displayed, either on another "confirmation display" (e.g., a region 3b of the display) or preferably may be highlighted on a virtual keypad 3a of the display 3 so as to decrease the number of system components.

Figure 1B:
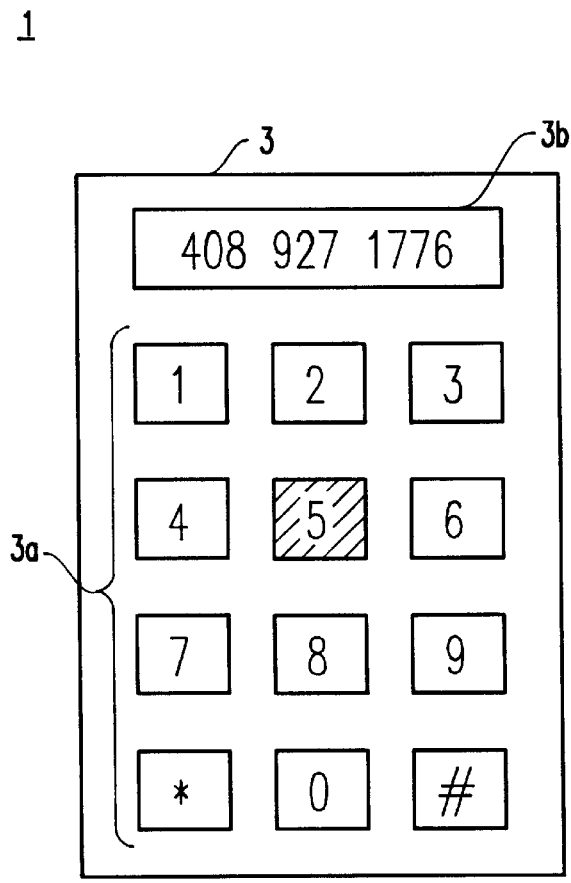
FIG. 1B illustrates a display 3 of the security system 1 shown in FIG. 1A.

The display 3, operatively coupled and interfaced with the camera system 2, is provided for indicating a plurality of numbers (e.g., the virtual keypad 3a), as shown in greater detail in FIG. 1B. Specifically, display 3 may be implemented by any suitable computer display with sufficient ability to depict graphical images. For example, the display 3 may include a cathode ray tube (CRT), a liquid crystal display (LCD) screen, a light-emitting diode (LED) screen, or another suitable video apparatus. It is noted that the keypad does not require a display. Indeed, the keypad could be an etching or a picture with small light-emitting diodes (LEDs) for providing feedback to the user.

A visor 5 may be provided over the display 3 to prevent observation of the keys of the virtual keypad 3a by a third party. Further, the display may include an area 3b for placing the digits in the order selected for the user to observe, as shown in FIG. 1B.

The user selects a number to actuate by looking at the appropriate number key, and thereafter actuating the selection button 4. Thus, selection button 4 is provided for (confirming selection) selecting a key on the display to which the user is gazing. While a button is shown in the exemplary embodiment of FIG. 1A (and in greater detail in FIGS. 1C and 1D), button 4 may be formed by a two-position switch or the like.

Thus, in its broadest implementation, selection actuator 4 is a user input device which includes an operator input device with an element sensitive to pressure, physical contact, or other manual activation by a human operator. This is referred to as "manual" input that "mechanically" activates the selection actuator 4 of FIG. 2, in contrast to gaze input from the gaze tracking apparatus. As an example, the actuator 4 may include a two-position switch as mentioned above. Further, the actuator could be audio-driven such as by a user's voice.

Additionally or alternatively, with suitable modifications to the system shown in FIGS. 1A–2, a computer keyboard, a mouse, "track-ball", a foot-activated switch or trigger, pressure-sensitive transducer stick such as the IBM TRACKPOINT® product, tongue activated pointer, and/or another mechanically activated device could be employed. As shown in FIGS. 1C and 1D, in the exemplary embodiment, a user which place a finger through an opening 6 in the housing to actuate the actuator 4.

In lieu of highlighting the numeral being gazed at on the virtual keypad of the display 3, the number may be illustrated on another area or region 3b of the display for confirmation by the user. However, if no separate area 3b is provided, the shading/highlighting may be used directly on the virtual keypad 3a, as shown in FIG. 1A. In the example of FIG. 1B, the "5" key is highlighted/shaded for confirmation by the user. As another example, highlighting could be performed via dither or the like.

FIG. 2 illustrates a block diagram of the security system and its constituent elements.

In an exemplary embodiment, the security system according to the present invention includes a computer/processor 20, the gaze tracking device 2, the selection actuator 4, and the display 3.

The computer/processor 20 includes one or more application programs 201, a user input module 202, a gaze tracking module 203, an integration module 204, and a video module 205.

The computer 20 may be a custom-built machine, or one selected from any number of different products such as a known and commercially-available personal computer, computer workstation, mainframe computer, or another suitable digital data processing device. As an example, the computer 20 may be an IBM THINKPAD® computer. Although such a computer clearly includes a number of other components in addition to those of FIG. 2, these components are omitted from FIG. 2 for ease of illustration.

The video module 205 comprises a product that generates video signals representing images (e.g., numerals of the user's telephone credit card, ATM personal identification number (PIN), or the like). These signals are compatible with the display 3, and cause the display 3 to show the corresponding images. Once again, the display 3 can be used by the invention to highlight the numerals on the display 3. Alternatively, the images (numerals) may be provided on a region separate from the virtual keypad (e.g., region 3b as shown in FIG. 1B) for confirmation by the user. The video module 203 may be provided by hardware, software, or a combination. As a more specific example, the video module 203 may be a video display card, such as a Super Video Graphics Applications (SVGA) card.

The application programs 201 comprise various programs running on the computer 20, and requiring operator input from time to time. This input may include text (e.g., numbers entered via the gaze-tracking apparatus 2) as well as positional (if a cursor is employed with the system for being able to insert a numeral between adjacent numerals as desired by the user). The positional information positions a cursor relative to images (e.g., numerals) supplied by the application program. The target selection information selects a portion of the displayed screen image identified by the cursor position at the moment the operator performs an operation such as actuating the selection button or the like. Examples of application programs 201 include commercially available programs such as database programs, word processing, and the like.

The user input module 202 includes a software module configured to receive and interpret signals from the selection actuator 4. As a specific example, the module 202 may include an actuator driver that receives electrical signals from the actuator 4.

Similarly, the gaze tracking module 204 includes a software module configured to receive and interpret signals from the gaze tracking apparatus 2. As a specific example, the module 204 may include a program that receives electrical signals from the apparatus 2 and provides an x-y output representing a point (a number) where the operator is calculated to be gazing, called the "gaze position".

As explained in greater detail below, the integration module 205 serves to integrate manual operator input (from the user input module 202 and actuator 4) with eye gaze input (from the gaze tracking apparatus 2 and gaze tracking module 204). The integration module 205 applies certain criteria to inputs from the components 2, 4 to determine how the numeral (or cursor, if so equipped) is shown on the display 3.

Although the software programming associated with the gaze tracking apparatus 2 may be included with the apparatus 2 itself, the particular example of FIG. 2 shows the associated software implemented in a gaze tracking module 201, as described below. The module 201 may be included solely in a computer 20, in the apparatus 2 or in a combination of the two, depending upon the particular application.

As shown in FIG. 3, another aspect of the invention is a digital data processing apparatus 30, which may be used to implement one or more components of the system 1 and which are used for security for a public service-providing system. This apparatus may be embodied by various hardware components and interconnections, as exemplified in FIG. 3 by a digital data processing apparatus 30 which includes a processor 301, such as a microprocessor or other processing machine, coupled to a storage 302. In the present example, the storage 302 includes a fast-access storage 302A, as well as nonvolatile storage 302B.

The fast-access storage 302A may include a random access memory (RAM), and may be used to store the programming instructions executed by the processor 30. The nonvolatile storage 302B may include, for example, one or more magnetic data storage disks such as a "hard drive", electronic read-only memory, magnetic tape, CD-ROM, or any other suitable storage device. The apparatus 30 also includes an input/output 31, such as a line, bus, cable, electromagnetic link, or other means for exchanging data with the processor 301.

Despite the specific foregoing description, ordinarily skilled artisans (having the benefit of this disclosure) will recognize that the apparatus discussed above may be implemented in a machine of different construction, without departing from the scope of the invention. For example, one of the storages 302A, 302B may be eliminated. Furthermore, the storage 302 may be provided on-board the processor 301, or even provided externally to the digital data processing apparatus 30.

Figure 1C:
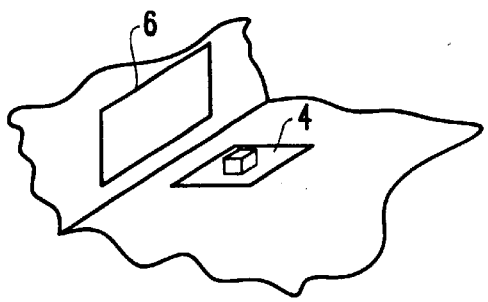
FIG. 1C shows an upside-down view of a button 4 for actuating a numeral of a keypad of the display 3.
Figure 1D:
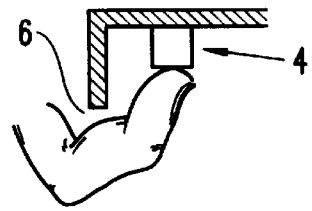
FIG. 1D illustrates a side view of an operator actuating the button 4 of FIG. 1C.

As mentioned above, the selection actuator 4, which includes the selection button 4 shown in FIGS. 1A, 1C and 1D, is a user input device which includes an operator input device with an element sensitive to pressure, physical contact, or other manual activation by a human operator.

Although the software programming associated with the selection actuator 4 may be included with the device 4, the particular example of FIG. 2 shows the necessary input device software implemented in the user input module 202, described below. The module 202 may be included solely in the computer 20, the actuator 4, or a combination of the two, depending upon the particular application.

As mentioned above, the display 3 provides an electronic medium for optically presenting numerals text and graphics to the operator, and more specifically the numerals of the user's telephone credit card, ATM card, etc.

The images presented on the display 3 are determined by signals from a video module 203, described below. The display 3 also can be referred to by other names, such as video display, video screen, display screen, video monitor, display monitor, etc. The display may include a cursor which could be employed to position an insertion point for numbers, etc. The cursor may comprise an arrow, bracket, short line, dot, cross-hair, or any other suitable image.

In addition to the hardware environment described above, a different aspect of the invention includes a computer-implemented method for number positioning by integrating gaze tracking and manual operator input. As an example, this method may be implemented in the particular hardware environment discussed above.

Such a method may be implemented, for example, by operating the computer 20 (FIG. 2), as embodied by a digital data processing apparatus 30 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor to perform a method to perform integrated gaze-tracking/manual actuation confirmation number positioning.

This signal-bearing media may include, for example, a RAM (not shown) contained within the computer 20, as represented by the fast-access storage 302A for example. Alternatively, the instructions may be contained in another signal-bearing media, such as a magnetic data storage diskette 500 (FIG. 5), directly or indirectly accessible by the computer 20.

Whether contained in the diskette 500, the computer 20, or elsewhere, the instructions may be stored on a variety of machine-readable data storage media, such as DASD storage (e.g., a conventional "hard drive" or a RAID array)! magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Operation of the Preferred Embodiment

Figure 4:
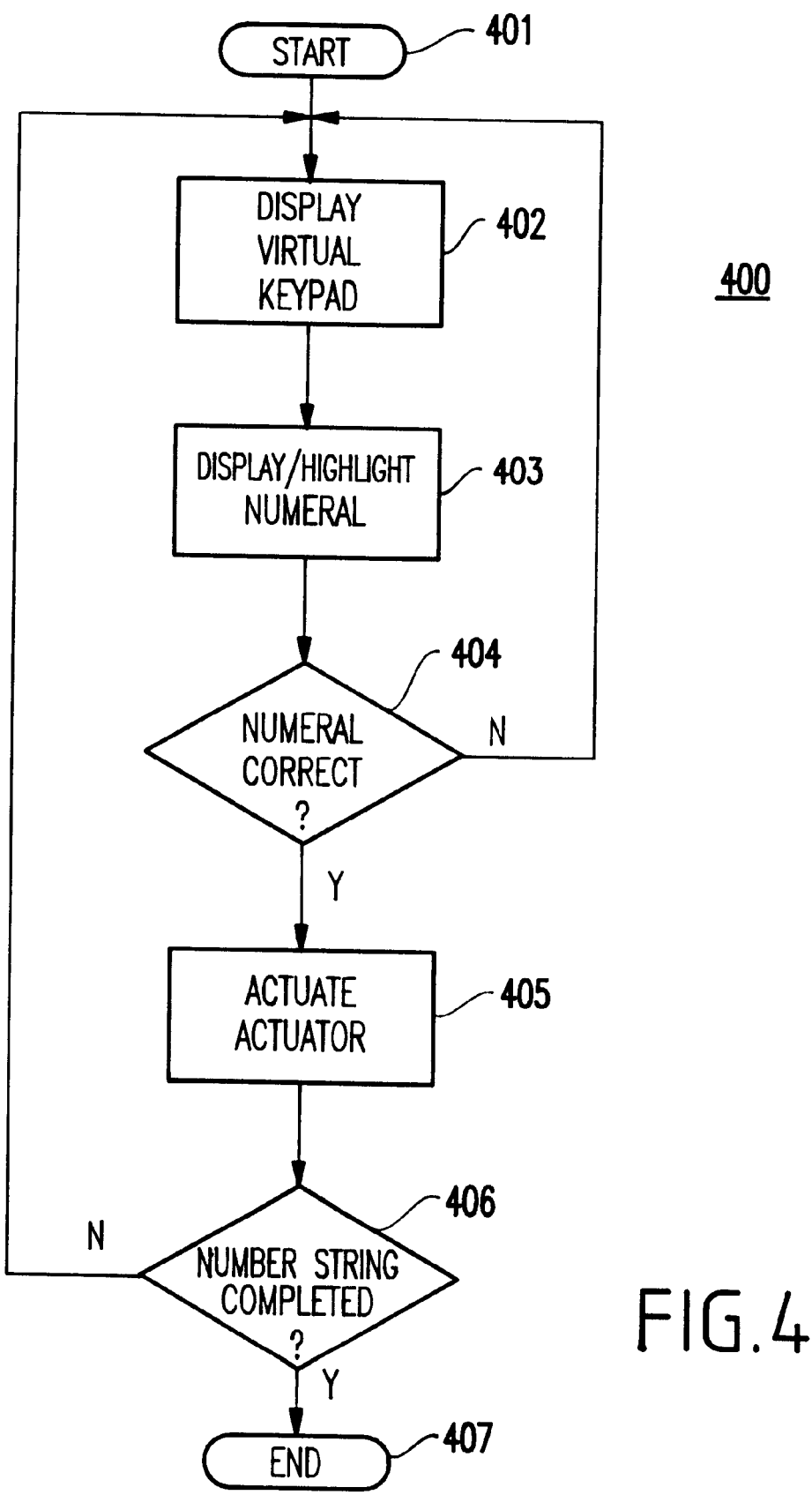
FIG. 4 illustrates a method of operation of the present invention.

FIG. 4 shows a sequence of method steps 400 to illustrate one example of the method aspect of the present invention. For ease of explanation, but without any limitation intended thereby, the example of FIG. 4 is described in the context of the hardware environment described above in FIGS. 1A–2.

The process 400 is initiated in step 401. As an example, this may occur automatically when the user approaches the service-providing mechanism at a predetermined distance, through use of various known sensing mechanisms or the like, when the user requests a service (e.g., taking the handset 1b "off the hook", or the like), when the computer 20 boots-up, under control of one of the application programs 201, when the operator manually activates the selection actuator (or another like actuator not illustrated) to indicate "start" to the computer, or at another time.

In step 402, the virtual keypad 3a is displayed.

In step 403, based on the integration module receiving x-y position signals from the gaze tracking module 204 and the known location of virtual keys on the keypad 3a of the display, a single key is highlighted (or additionally/alternatively displayed on a region 3b separate from the virtual keypad), providing a suitable output signal to the display 3.

In step 404, it is determined by the operator whether the numeral is correct. If the operator determines the number to be correct, then the actuator 4 is actuated in step 405, and the number is "fixed" on the display (e.g., highlighted on the virtual keypad or displayed in region 3b of the display, if so equipped). It is noted that the highlighting of the key is performed such that the keys are viewable at a predetermined close distance (e.g., no more than several feet away from the display 3 or more preferably not visible to observers not looking through visor 5) but are not observable by an observer beyond the predetermined distance. If the numeral is not correct, for example, the user merely looks at the correct key until it is actuated, and the process reverts to step 402.

In step 405, the integration module 205 receives the manual user input (e.g., from actuator 4 or another input device through user input module 202). In the present example, in step 405, the operator, after determining the numeral is correct, activates the actuator 4 (e.g., a button, two-position switch or the like) from a first position to a second position. Other actuators could be suitably employed and interfaced with the integration modules.

Thus, upon the switch being activated, the number (e.g., being gazed at on the display) is "selected". As mentioned above, if the system is so equipped, the number may be illustrated on display 3 having the visor 5 thereover for confirmation by the user, or if no separate display and visor are provided, a shading/highlight may be used as shown in FIG. 1B. The number selected through gazing is displayed at a predetermined position on the display in the order of input.

It is noted that if a cursor or pointing device is integrated into the system, a numeral may be inserted between first and second adjacent numerals, for example, when an operator determines that a numeral was erroneously "skipped". The cursor or positioning device would be advantageous over having to begin the process again. For example, in the sequence of numbers shown in region 3b in FIG. 1B, if the number "2" had been erroneously skipped between displaying of "9" and "7", a cursor would be useful to insert the number "2" between the "9" and the "7".

In step 406, the user determines whether the number string is completed. Such a step may be implemented by the computer sensing whether a number of digits of the number string having been filled has reached a predetermined number (e.g., in the example of FIG. 1B, 9 digits being filled of the 10-digit number string would indicate that the process must revert to step 402), or by a timer which indicates the gaze-based selection of numerals on the number pad has been completed or no other gaze-based activity is being undertaken.

The process ends at step 407.

While the invention has been described in terms of a single preferred embodiment, those skilled in the art will recognize that the invention can be practiced with modification within the spirit and scope of the appended claims.

For example, the application of the above-described invention is not limited to telephones, ATMs, fuel service stations, voting booths, kiosks, course registration areas, limited-access buildings, and the like. Thus, the present invention is applicable for secure data entry in any publicly accessible computer-controlled devices and computer devices.

For example, the invention could be easily tailored to public computers on campus, public copy machines, vending machines, or to any public kiosk. Additionally, the current trend is for more and more services and information to be accessible publicly. Thus, kiosks in various forms in shopping malls, train stations, etc. are becoming more prevalent and such kiosks would find great benefit with the invention for secure data entry.

Further, as mentioned above, a separate display region 3b may be provided additionally to or alternatively to highlighting/shading of the number keys on the virtual number pad.

Additionally, instead of a manually-operated actuator, a voice-actuated actuator could be employed.

Further, the system may or may not require calibration. If calibration is required, such calibration can be performed in any of a number of known ways and with known hardware. By the same token, calibration may not be required since eye trackers could be employed to control focus.

What is claimed is:

1. A system for secure data entry, comprising:

a virtual keypad having a plurality of keys;

means for detecting a gaze of a user directed to a virtual key of said keypad; and an actuator, operable by the user and obscured from a non-user observer, for confirming a virtual key selection, wherein said gaze of a user is obscured from a non-user observer.

2. The system according to claim 1, further comprising a display for displaying said virtual keypad and a key selected by said user.

3. The system according to claim 2, wherein said means for detecting comprises an optical gaze-tracking mechanism.

4. A system for secure data entry, comprising:
a virtual keypad including a plurality of keys;
an eye tracker for tracking eye movement of a user, and for computing a coded input from an eye movement of said user gazing upon at least a selected one of said keys of said virtual keypad; and
an actuator which is obscured from a non-user observer, for being selectively actuated by said user upon confirmation of said coded input by said user,
wherein said gaze of a user is obscured from a non-user observer.

5. The system according to claim 4, further comprising:
a display for displaying said virtual keypad and said coded input for confirmation by said user.

6. The system according to claim 5, further comprising:
a blocking structure mounted over said display for receiving an eye of said user, and for blocking a view of said non-user observer.

7. The system according to claim 5, wherein said selected one of said keys is highlighted upon actuation of said actuator.

8. The system according to claim 4, wherein said eye tracker comprises a camera system.

9. The system according to claim 4, wherein said selected one of said keys is highlighted based on said user gazing upon said selected one of said keys.

10. The system according to claim 4, further comprising a lip for obscuring said actuator from said non-user observer.

11. The system according to claim 4, further comprising means for actuating said actuator by an auditory command.

12. The system according to claim 4, further comprising means for providing visual feedback to said user as to which key of said virtual keypad will be selected, such that the user confirms the number visually before actuating said actuator.

13. A computer-implemented method for eye gaze-assisted number generating, comprising:
operating a gaze tracking apparatus to monitor eye orientation of a computer operator as the operator views a virtual keypad having a plurality of keys thereon;
according to the operator's eye orientation, determining the key of the virtual keypad being gazed at by the operator; and
highlighting said key on said virtual keypad for confirmation by said operator,
wherein said highlighting is obscured from a non-user observer, and
wherein a gaze of said operator is obscured from a non-user observer.

14. The method according to claim 13, further comprising:
displaying said virtual keypad and said coded input for confirmation by said user; and
computing a measured gaze position of the operator upon the virtual keypad according to the monitored eye orientation, and concurrently monitoring an operator input device for activation by the operator.

15. The method according to claim 14, wherein said operator input device comprises one of a mouse and a keyboard.

16. The method according to claim 14, further comprising:
providing visual feedback to said user as to which key of said virtual keypad will be selected, such that the user confirms the number visually before actuating said operator input device.

17. The method according to claim 13, wherein said key is confirmed by said user by an auditory command.

18. A method of providing secure data entry, comprising the steps of:
providing a virtual keypad having a plurality of keys;
determining which visual key of said keypad a user is looking upon; and
confirming, by said user, key selection,
wherein said confirming is obscured from a non-user observer, and
wherein a gaze of said user is obscured from said non-user observer.

19. The method according to claim 18, further comprising displaying said virtual keypad.

20. A signal-bearing medium tangibly embodying a program of machine-readable instructions executable by a digital processing apparatus to perform a method for computer-implemented eye gaze assisted number generating, said method comprising:
operating a gaze tracking apparatus to monitor eye orientation of a computer operator as the operator views a virtual keypad a plurality of keys thereon;
according to the operator's eye orientation, determining a key of the display being gazed at by the operator; and
highlighting said key on said virtual keypad,
wherein said highlighting is obscured from a non-user observer, and
wherein a gaze of said operator is obscured from a non-user observer.

21. The signal-bearing medium according to claim 20, said program further comprising:
displaying said virtual key pad on a display; and
computing a measured gaze position of the operator upon the virtual keypad according to the monitored eye orientation, and concurrently monitoring an operator input device for activation by the operator.

22. A computer-driven eye gaze assisted number displaying system, comprising:
a gaze-tracking apparatus for monitoring eye orientation of an operator as the operator views a virtual keypad having a plurality of keys; and
a computer, responsive to the monitored eye orientation, for computing a selected key of said plurality of keys according to the monitored eye orientation, and for providing an output to highlight said selected key on said virtual keypad,
wherein said highlight is obscured from a non-user observer, and
wherein a gaze of said operator is obscured from a non-user observer.

23. The system according to claim 22, further comprising:
an operator input device, responsive to mechanical activation by the operator while viewing said virtual keypad,
wherein said computer is further responsive to detection of activation of the operator input device while said user is gazing upon said selected key to highlight said selected key.

* * * * *